United States Patent [19]
Soignet et al.

[11] Patent Number: 5,365,427
[45] Date of Patent: Nov. 15, 1994

[54] METHOD AND APPARATUS FOR INDICATING THE OPTIMAL SHOT PATH OF A BASKETBALL

[76] Inventors: Gerard C. Soignet, 110 Isabelle Pl., Thibodaux, La. 70301; Wyndham C. Payne, 300 Ellen St., Ama, La. 70031

[21] Appl. No.: 16,028

[22] Filed: Feb. 10, 1993

Related U.S. Application Data

[63] Continuation-in-part of Ser. No. 818,828, Jan. 10, 1992.

[51] Int. Cl.$^5$ ............................................. G06F 15/44
[52] U.S. Cl. ............................. 364/410; 273/1.5 A; 273/1.5 R; 273/25; 340/323 R
[58] Field of Search .................... 364/410; 273/1.5 R, 273/1.5 A, 2, 25; 340/323 R

[56] References Cited

U.S. PATENT DOCUMENTS

| | | | |
|---|---|---|---|
| 3,342,486 | 9/1967 | Farley | 273/1.5 |
| 3,598,976 | 8/1971 | Russell | 235/151 |
| 3,868,109 | 2/1975 | Fowler | 273/187 A |
| 4,213,606 | 7/1980 | Wilson | 273/1.5 A |
| 4,545,576 | 10/1985 | Harris | 273/25 |
| 4,836,551 | 6/1989 | LaSalle | 273/185 B |
| 4,882,676 | 11/1989 | Van De Kop et al. | 364/410 |
| 4,999,603 | 3/1991 | Mele et al. | 340/323 R |
| 5,125,651 | 6/1992 | Keeling et al. | 273/1.5 R |
| 5,139,263 | 8/1992 | Feo | 273/186.1 |
| 5,160,839 | 11/1992 | Nishiyama et al. | 250/222.1 |

Primary Examiner—Roy N. Envall, Jr.
Assistant Examiner—Gita D. Shingala
Attorney, Agent, or Firm—Joseph T. Regard

[57] ABSTRACT

A system for evaluating the pre-existing free throw ability of the player, evaluating the players shot path, then defining the optimal path of the thrown ball from the point of release of the player to the rim of the target goal, and providing a target area suspended along the optimal path to assist the player in developing his or her ability to emulate the optimal path in adjusting their free throw method. The preferred, exemplary embodiment of the present invention teaches a two dimensional target path or three dimensional target conduit suspended along the defined optimal path of the calculated "perfect" free throw for the evaluated player, the target provided by a laser or series of lasers. The resulting target provides a visual indicator of the optimal path of the ball in free throw, which the user can attempt to emulate during practice, in order to improve and redefine his or her free throw ball path. Through repeated attempts at emulating the optimal path, the player can develop a "muscle memory" of the optimal arc trajectory for the "perfect" free throw, thereby providing a throw path having the highest margin of error, resulting in an improvement in scores. The present invention may utilize other systems for indicating the preferred path of the ball, such as motion detectors, a series of hoops along the optimal path, or related methods, many of which are disclosed in the present invention as alternative embodiments.

10 Claims, 4 Drawing Sheets

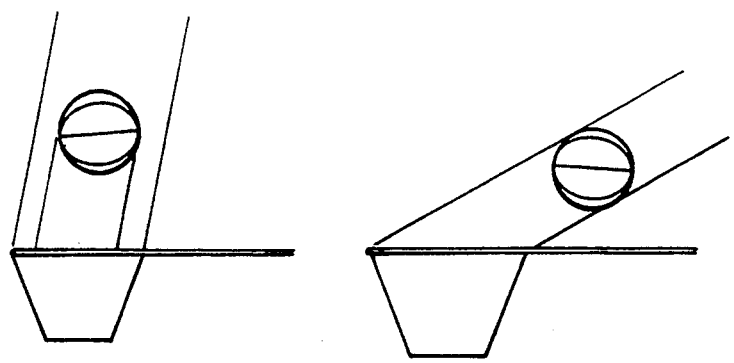
FIG. 1a  FIG. 1b
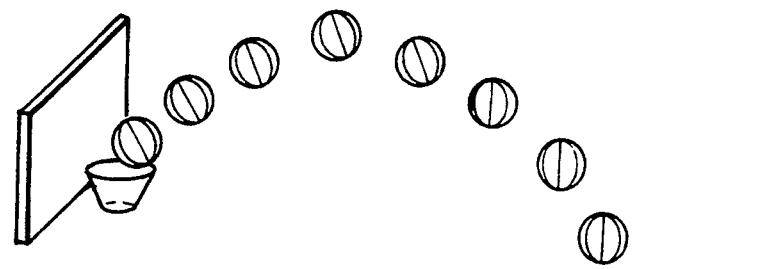
FIG. 2
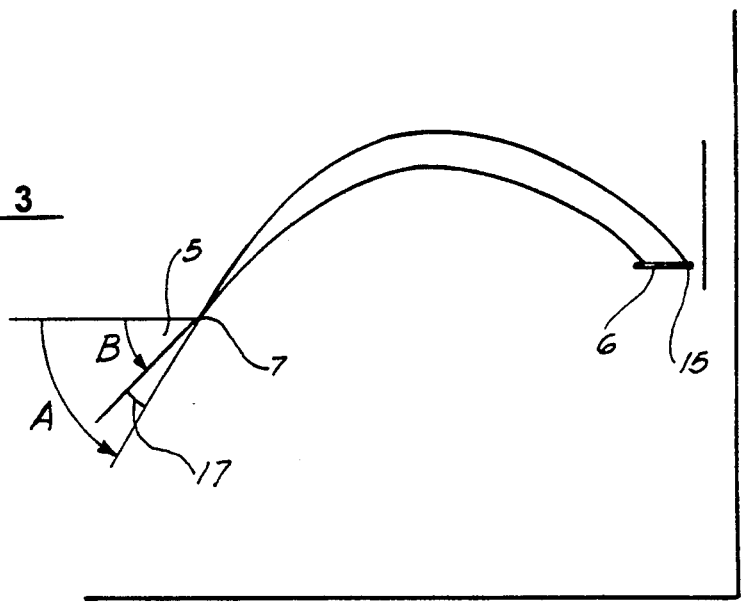
FIG 3

METHOD AND APPARATUS FOR INDICATING THE OPTIMAL SHOT PATH OF A BASKETBALL

STATEMENT OF CONTINUING APPLICATION

The present invention is a continuation-in-part of U.S. patent application Ser. No. 07/818,828, filed Jan. 1, 1992, listing Gerard C. Soignet and Wyndham C. Payne as inventors, entitled "Free Throw Trainer" now abandoned.

BACKGROUND OF THE INVENTION

1. Invention Field

The present invention relates to sport training systems and in particular, to a novel method and apparatus for evaluating and improving the free throw performance of a basketball player. The preferred embodiment of the present invention contemplates a system for examining the pre-existing free throw ability of the player, evaluating the players shot path, then defining the optimal path of the thrown ball from the point of release of the player to the rim of the target goal, and providing a target area suspended along the optimal path to assist the player in developing his or her ability to emulate the optimal path in adjusting their free throw method.

The preferred, exemplary embodiment of the present invention teaches a two dimensional target path, or three dimensional target conduit, seemingly suspended in mid air along the defined optimal path of the calculated "perfect" free throw for the evaluated player, the target provided by a laser or series of lasers. The resulting target provides a visual indicator of the optimal path of the ball in free throw, which the user can attempt to emulate during practice, in order to improve and redefine his or her free throw ball path. Through repeated attempts at emulating the optimal path, the player can develop a "muscle memory" of the optimal arc trajectory for the "perfect" free throw, thereby providing a throw path having the highest margin of error, resulting in an improvement in scores.

The present invention may utilize other systems for indicating the preferred path of the ball, such as motion detectors, a series of hoops along the optimal path, or related methods, many of which are disclosed in the present invention as alternative embodiments.

2. General Background Discussion

Few things are more disappointing than watching a favorite basketball team lose a close game due to poor free throw shooting. It does not take the coaching mind of one of the best to realize the importance of free throw shooting in basketball competition. Therefore, there exists a need for evaluating a players free throw technique, as well as a system for providing guidance and training in order to improve said players performance in this regard.

While such sports as gymnastics, ice skating, golf, and olympic track have taught some form of computer training, often with excellent results, basketball free throw technique has remained relatively untouched by the computer revolution.

A list of patents which may be of pertinence with regard to the present invention might include:

| patent number | Inventor | issue date |
|---|---|---|
| 5,125,651 | Keeling et al | June 30, 1992 |
| 4,545,576 | Harris | Nov. 08, 1985 |
| 4,213,606 | Wilson | July 22, 1980 |
| 3,342,486 | Farley | Sept 19, 1967 |

U.S. Pat. No. 5,125,651, issued 1992 teaches first and second angularly displaced hoops upon the same vertical plane, arranged so as to represent the "descending path of a desirably shot basketball" when one passes said ball through first and second hoops. As noted in column 3 of the specification, "proper arc is... crucial in hitting a high percentage of shots. Thus thinking of arc In terms of what a ball would "see" when shot toward the basket, the views would vary from a straight line when shot with no arc to a full circle if shot so as to fall vertically into the hoop".

U.S. Pat. No. 3,342,486 issued 1967 teaches a "Practice Rail Attachment for a Basketball Backboard" configured to train the player to "release the ball at an angle of flight closely comparable to that commonly adjudged to represent the best shooting form... [s]ince it is common knowledge in the basketball coaching field that a high arching set shot and a high arching jump shot are the most desirable of shooting forms..."

This technique of providing an attachment to the rim for assisting in the development of an "optimal shot" as disclosed above has been embodied in various other forms, as far back as 1936 (2,039,794) and even 1925 (1,544,453).

U.S. Pat. No. 4,213.606 teaches another type of rim attachment, configured to train the player to "bank the basketball from an optimum position on the backboard". Other patents, disclosing various other, less pertinent basketball devices having multiple hoops, are enclosed for your information and consideration.

Laser devices have been utilized in sports to analyze the path of various game balls; however, no particularly pertinent devices were found which Implemented even remotely the method of the present invention.

U.S. Pat. No. 4,882,676 teaches a "Method and Apparatus for Rating Billiard Shots and Displaying Optimal Paths" utilizing lasers for tracking and indicating ball paths of billiard balls, for assisting the subject in improving his/her technique.

U.S. Pat. No. 4.545,5767, entitled "Baseball-strike Indicator and Trajectory Analyzer, and Method of Using Same" teaches an analyzing device for providing information on the performance of the subject(s) in a baseball context.

Thus, while the prior art does anticipate various accessories for assisting a player develop his shot, many teach an invention which may embody a basic, rather limited target structure in close proximity to the rim itself, and do not teach the present, comprehensive shot analysis, critique, and training system of the present invention. Unlike the prior art, the present invention contemplates a target emulating the full path of the shot, illustrating to the user the exact, optimal shot path, from the players point of release to the target goal rim, allowing the user to attempt to directly emulate said optimal shot path in such a manner as to readily discern success or failure in doing so.

In many sports, the emphasis is on the form of the athletes. In basketball, however, form is not the final criteria. The important criteria, rather, is how form affects results, i.e. whether the shot goes in or not. With that understanding, comes the ability to visualize the perfect shot, which is not as easy as it may sound, as one must experience (at least once) the practicing of the perfect shot in order to visualize correctly one attaining the perfect shot.

It is here that technology and athletics merge. The present invention teaches a free throw training system, which will help players develop their optimum shot. The advantage of this technology is that it removes amorphous concepts such as "feel" and "touch" from the coach's lexicon, and replaces them with a scientifically accurate visualization technique to aid practice. The result is that players will develop muscle memory of the perfect shot much quicker, without having to exhaust the old trial-and-error method.

SUMMARY DISCUSSION OF THE INVENTION

Once a player reaches the college level, he has developed adequate muscle memory and control, which gives him the ability to accurately repeat a shot. This would suggest that one difference between a 50% free throw shooter and a 90% free throw shooter is the projectile path or other dynamic phenomena of the ball.

To explain, imagine two people throwing balls into a box. Both have the same ball throwing ability, but one person's box is larger. This person would naturally be more successful, because he has a greater margin of error.

But in basketball, all players shoot at the same sized goal. One key to increasing a players shooting percentage is for him to adjust the variables he can control so that his shot has the highest margin of error possible.

A player may not be consciously aware of the kinematics and kinetics associated with each shot, but with practice, it is something he gets a feel for. There are a number of variables that need to be mastered for each shot. The more relevant are the position In which the ball is released, the angle at which it is released, the force exerted on it, and the amount of spin applied.

Typically, a player's only gauge of how good of a shot he has taken is whether or not the ball goes through the hoop. However, when this becomes the players sole criteria for success, his accuracy will change as the circumstances change - pressure, fatigue and urgency all take their toll.

The present invention can provide the player with a constant in his visualization process. By practicing with the system of the present invention, the player becomes aware if his shot is flattening with fatigue, or if he is exerting too much force in trying to keep the ball in the proper trajectory.

Basketball legend Larry Bird speaks of Being the ball go through the basket before he releases it. Golfer Greg Norman emphasizes the importance of imaging the golf shot executed to perfection before he even addresses the ball. The key for both of these athletes, and many others who have climbed to the top of their field, is visualization.

Some college basketball coaches have employed meditation, having their players lie quietly in a dark room, and imagine seeing themselves making free throws. The problem with this approach is that each player visualizes his own shot going through the hoop, even if it has mechanical flaws. Visualizing an incorrect or flawed shot is just as counter-productive as practicing a poor shot.

Golfer Jack Nicklaus once said that a player could stand on the practice tee and hit hundreds of balls, but if he did not know what he was doing, he wasn't going to get anything out of it. An athlete has to know what a good shot is before he can practice it.

Using technology to give a player a correct shot to practice and visualize is the theory on which the present invention is based.

Using the free throw as an example, a player can learn to release the ball from the same point every time. Therefore, a single, specific, optimum free throw can be found for that player. By optimum we mean, mathematically, there is a single shot from which the player can deviate from, more than any other, and still render a successful shot.

To further explain this concept, let us imagine decreasing the amount of arch on the shot to the point that if the arch is decreased any further, it would be impossible for the ball to go cleanly through the goal. At this point, the shot has zero margin of error. (See FIG. 1b) If there is any deviation from a perfect path, the shot will be unsuccessful.

Now, if the arch is increased, the margin of error associated with the angle of entry will increase, in that a small amount of deviance in the shot will result in the ball still entering the hoop, although closer to the front or back of the rim. (See FIGS. 1a and 3).

But as the arch is increased, the actual distance the ball must travel through the air will also increase. This will cause the shot to have more potential for error and therefore, decrease the margin of error. Somewhere between two extremes lies each individual's optimum shot.

The spin on the ball will also affect the shot by affecting the drag force on the ball and by affecting the stability of the flight of the ball (sufficient spin will help avoid the unstable "knuckle ball" effect).

Standard mathematics can be utilized to find the interdependence of these variables and solve for an "optimum shot" for each particular person. This optimum shot would specify the correct amount of arch, force on the ball, angle of release, and amount of spin which would yield the highest margin of error.

It should be noted that such an analysis would have to be done for each player. Each player releases the ball at a unique location and as a result, we are dealing with a different and unique problem for each player.

A vivid and precise visualization or conceptualization of the free throw shot, or any field goal, can help a player to control and to fine tune the above mentioned variables and thus yield a more perfect practice. In fact, it is a quite conceivable that part of the difference between a good free throw shooter and a great free throw shooter could be this vivid and precise visualization. The ability to clearly visualize is certainly a quality that can be developed.

A study was done on free throw shooting in which a number of players at the high school level were asked to shoot free throws to find out their percentage. Then half of them would practice 100 free throws a day for a week while the other half would visualize 100 free throw shots a day for a week. It was found that the improvements were Identical. Some coaches on the college level have their players stand in a dark room and practice visualization of free throws. This proposed system will give the player the capability to practice and visualize at the same time.

The method of the present invention begins with determining the position that the player releases the ball relative to the goal. This is easily accomplished by video taping the player from the side while on the player's other side setting up a specially scaled backdrop. The position of release can be read from this scaled backdrop. Of course, this point of release may vary a bit, especially for poor shooters, but in these cases an average will be taken. Also, as a player progresses with the program, and his shot is modified, a new location of release will be recorded.

By placing special marks on the ball, the video camera recording and subsequent examination can also indicate the amount of spin on the ball. This Is as simple as replaying the shot in slow motion and counting the number of rotations it makes. Again, an average from several shots will be taken.

As mentioned before, the present invention may utilize a computer program which will solve for an individual's "optimum" shot (see FIGS. 2-3). This program takes data from the video such as point of release, spin, and arch, and designs the optimum dynamic path the ball should take to have the maximum margin of error. This now reduces the problem to finding a way to let the player instantaneously know how much his or her shot is deviating from optimum and provide the player with a clear and precise visualization of the path of the shot.

As discussed supra, the preferred, exemplary embodiment of the present invention utilizes a laser system to Indicate the path of the optimal shot for the player to utilize in his/her attempts at emulating same.

In the first method, a laser will be used to draw a vertical plane, upon which the center of the ball should remain at all times, this plane will split the backboard in half and will go down the center of the lane. The laser will be mounted over head as to not bother the player. A second laser will be mounted in a profile position and will be programmed by our computer program to draw out the arch of the optimum shot (see FIG. 6). This laser system will provide a concrete and precise visualization of the shot. The lasers will draw lines on the ball (Similar to that of the cross hairs of a rifle scope) at all times and the player will know how far off his shot is by looking at where the line is relative to the center of the ball.

The second method can be accomplished by utilizing two overhead and two profile lasers. The ball should remain between the two planes drawn by the two overhead lasers if the shot remains "on line". It also should remain between the two curved planes if the shot has the correct arch (see FIGS. 7a-7c). A successful shot would be one where no laser light is seen on the ball while it is in the air. If laser lines are present the player compensates for the error, and continues his practice.

It is thus an object of the present invention to provide a system for analyzing and suggesting ways to Improve a player's free throw ability.

It is another object of the present invention to provide a system for providing the optimal free throw path for a player.

It is another object of the present invention to provide a device to indicating the optimal free throw path for a player, in such a manner as to allow said player to attempt to follow said optimal path in a practice context, In order to develop a muscle memory of how it "feels" to shoot said perfect path.

It is another object of the present invention to provide a laser apparatus for indicating in free space the optimal path of a free throw shot, from generally the anticipated point of release of the player, to the edge of the rim.

It is still another object of the present Invention to provide a device to illustrating the perceived optimal free throw path of a player, in the form of a conduit target path for accepting a basketball, said conduit target path configured such that there is provided indicia for indicating when said basketball varies from said conduit target path, such Indicia, for example, comprising laser light reflected from said basketball.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1a is a side view of a basketball and goal, illustrating the high margin of error applicable to a basketball having a high angle of incidence passing through a target goal, and the tolerances therebetween.

FIG. 1b illustrates the target goal of FIG. 1a, further illustrating the most restrictive path a ball can take, wherein the angle of incidence is much lower, and wherein the basketball must have a zero margin of error to pass therethrough.

FIG. 2 illustrates a side view of an exemplary path or trajectory of a basketball having a considered optimal shot, wherein the arc of the ball allows for the basketball having a high margin or error relative the target goal rim.

FIG. 3 is a chart illustrating the trajectory path of two basketball shots A,B at a target goal rim, reflecting the maximum and minimum angles of release and respective trajectories, respectively.

FIG. 7b illustrates the placement of the lasers utilized in achieving the conduit-type target of FIG. 7a.

FIG. 7c illustrates in detail the scanning grid of the overhead lasers in achieving the conduit-type target of FIG. 7a.

DETAILED DESCRIPTION OF THE INVENTION

In practicing the present invention, the following step by step procedure should be implemented with each player participating. However, any one of the following procedures can also be utilized independent t of the others in order to enhance a players ability, or correct a particular problem area.

Referring to FIG. 2, the first step in practicing the method of the present Invention is to determine the players I point of release 2 relative to the goal or rim. The point of release 2 is defined as the location of the ball 3 relative to the rim or goal 4, at that instant when the shooter or player 1 no longer has any influence on the flight of the ball 3, i.e., when the ball leaves the shooters fingertips. This point of release 2 can be characterized and measured in components - a horizontal and a vertical component relative the goal. An exemplary method of determining the point of release may comprise the following "Grid Backdrop Method".

Figure 4:
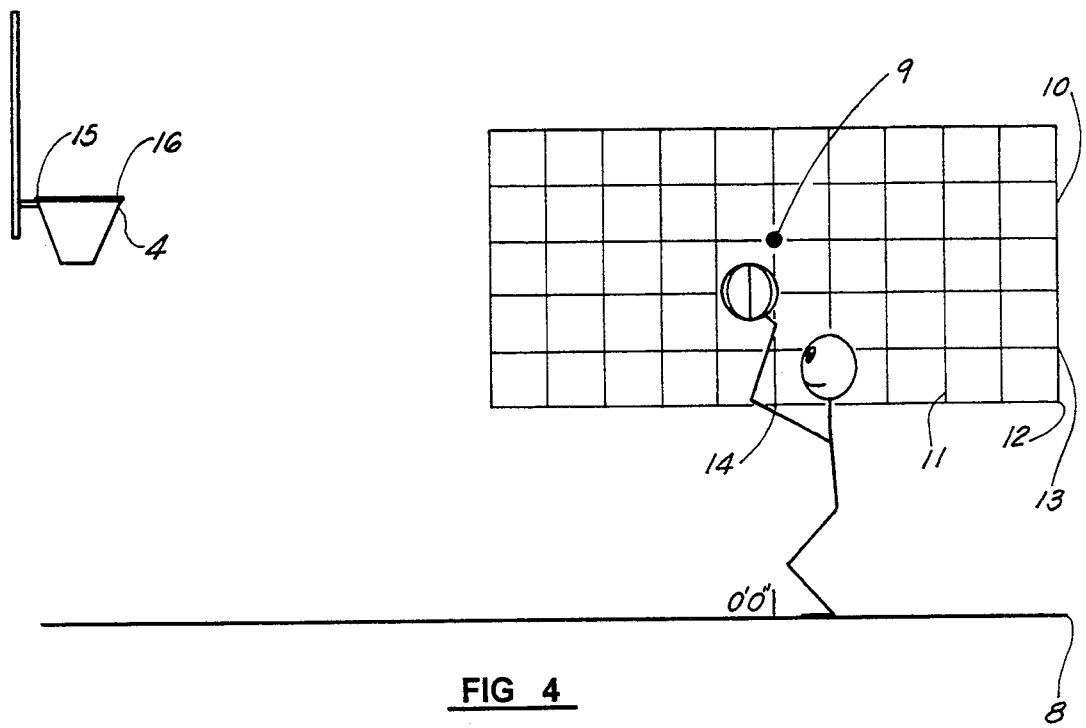
FIG. 4 illustrates the exemplary grid utilized in the calculation of the path of an exemplary players free throw trajectory of the present invention, from their point of release to the target goal rim.

In practicing this method, one sets up a grid backdrop, such as, for example, illustrated in FIG. 4. As shown, the stripes forming the grid 10 are spaced a measured distance, for example, every six or twelve inches.

The 0'-0" reference 14 vertical stripe V is aligned with the free throw line, and positive horizontal distances are measured in the direction away from the basketball goal 4 and negative horizontal distances are measured In the direction toward the basketball goal 4.

The 0'-0" reference 13 horizontal stripe H of the grid backdrop may be, for example, located at an arbitrary height of 6'0" above the playing surface. Positive vertical heights are measured in the direction above this reference stripe, and negative vertical heights are measured in the downward direction below this stripe.

An exemplary method of recording and analyzing the players performance relative the grid may be utilized as follows. The grid backdrop may be set off to one side of the shooter, and a video camera is set up, at an equal distance from the shooter, off to the other side. The height of the camera lens is set at 6'-0" (level with 0'-0" horizontal reference mark on the backdrop) and the camera is set in line with the free throw line. The camera faces the 0'-0" reference horizontal and vertical lines of the backdrop. The player then shoots several free throws while the video camera records the shot patterns.

An alternative embodiment of the present invention may dispense with the necessity of a physical back drop grid, relying instead upon a grid template placed over the video monitor screen or camera, or a computer generated grid superimposed over the video, via video editor, Amiga TM or Apple TM computer, or the like. Of course, the grids would have to be of correct x and y coordinate intersections as to represent accurate measurements on the court.

Afterwards, the video is played back frame-by-frame in order to Isolate the frame where the ball just leaves the shooter's fingertips. In this frame, the position of the ball will be read, relative to the reference marks on the grid. This can be repeated for each free throw taken, so that an average of the readings can be made.

Because the shooter releases the ball at the midpoint between the video camera and backdrop, the point of release, relative to the 0'-0" reference lines will be one half of the distance that is read from the scale.

Knowing the distance readings relative to the reference marks on the scaled backdrop, and knowing the position of the reference marks relative to the free throw line and knowing the position of the free throw line relative to the rim, the point of release relative to the rim, as well as the initial velocity of the shot, can be calculated using standard college physics.

For example, in calculating the optimum shot, each individual shot trajectory is characterized by an initial velocity. Low arch shots will have a relatively low Initial velocity, while height arch shots will have a larger initial velocity. The initial velocity will be varied by small Increments, and the margin of error will be calculated, as follows.

First, the angle of release 5 for a hypothetical shot (see FIG. 3), utilizing the players angle of release B is calculated, such that the ball Just scrapes the front 6 of the rim. In this calculation, the point of release 7 or, thought of in another way, the starting point of the basketball (projectile) in free fall is known. The end point of consideration of the basketball path is known, as it was taken to be the point where the ball just scrapes the front 6 of the rim. The initial velocity of the ball is known because it was measured above. And, utilizing the initial velocity of the ball as released by the player, there is only one angle of release that can satisfy these parameters that we have set. This angle of release can be calculated, again, by utilizing basic, standard kinematic equations that can be found in any college freshman physics book. For example, to calculate the shooter's optimum trajectory, based upon his point of release, and exemplary computer program, or formula for calculation could proceed as follows.

Referring to FIG. 4, the vertical, or "Y" reference point, Y=0.0 is in this application taken as the floor, or playing surface. Positive vertical distances are measured in the upward direction.

The horizontal, or "X" reference point 14 is taken as the free throw line. Positive horizontal measurements are taken in the direction towards the goal. Negative horizontal measurements are taken in the direction away from the goal.

The program user then first enters the shooters "Y" component of vertical release, and "X" component of horizontal release. The initial point of release 9, or starting point of consideration of the projectile in free fall relative to the reference coordinate system is now known.

The coordinates for the ball as it enters the goal at the back 15 of the rim are known and are already in the program, for example:

Y at the back of the rim = 10 feet

X at the back of the rim = a − b − c = 14.1021 feet where a = horizontal distance from the free throw line to the backboard; i.e., 15 feet b = horizontal distance from the backboard to the back of the rim; i.e., 0.5 feet c = radius of the basketball; i.e. 4.77 inches = 0.399 feet At this point, the program user inputs $V_{ox}$, which is the initial velocity of the ball in the X, or horizontal direction. $V_{ox}=?$ The known information to this point is enough to define a single, specific shot, or projectile trajectory. There is only one path or trajectory the projectile can follow to satisfy these values. Knowing these values, other information about the projectile flight can be found using basic physics equations.

The time required for the ball to travel from the Point of Release (POR) 9 and enter the hoop at the Back of the Rim (BOR) 15 is then calculated using, for example, the following equation:

$$TBOR = (x_1 - X_0)/V_{ox}$$

Where

TBOR = the Time required for the ball to travel from the point of release and to enter the hoop at the Back of the Rim.

$X_1$ = the X coordinate of the ball at the back of the rim.

$X_0$ = the X coordinate of the ball at release.
$V_{ox}$ = the Initial velocity of the ball in the X direction.

The Y component 12, or vertical component of velocity of the ball at the point of release 9 is then calculated by the equation:

$$V_{oy} = (Y_1 - Y_0)/TBOR + (g)TBOR/2$$

Where
$V_{oy}$ = Vertical component of velocity of the ball at the point of release;
$Y_1$ = Vertical height of the ball as it enters the goal at the back of the rim;
$Y_1$ = Vertical height of the ball when it is released;
g = Gravitational Constant at 32.2 Feet/Sec$^2$
TBOR = Time required for the ball to travel from the point of release and to enter the hoop at the back of the rim.

The angle that the ball is released is calculated by the equation:

$$AEBOR = Tan(V_{oy}/V_{ox})$$

AEBOR = Angle that the ball is released relative to the horizon;
$V_{oy}$ = Initial velocity of the ball in the Y direction;
$V_{ox}$ = Initial velocity of the ball in the X direction.

Utilizing the same point of release, a second shot is then considered; a shot where the ball enters the hoop at the front 16 of the rim. The time required for the ball to travel from the point of release to the point where the ball enters the hoop at the front of the rim is calculated by the equation:

$$TFOR = (X_2 - X_0)V_{ox}$$

Where
TFOR = Timer required for the ball to travel from the point of release 9 and enter the hoop at the front of the rim 16.
$X_2$ = X coordinate of the ball when it enters the hoop at the front of the rim;
$X_0$ = X coordinate of the ball at the time of release;
$V_{ox}$ = Initial velocity of the ball in the X direction.

The initial velocity of the ball In the Y direction is then calculated by the equation:

$$V_{oy} = (Y_2 - Y_0)/TFOR + gTFOR/2$$

Where
$V_{oy}$ = Initial velocity of the ball in the Y direction;
$Y_2$ = Y coordinate of the ball as it enters the hoop at the front of the rim;
$Y_0$ = Y coordinate of the ball as it is released;
TFOR = is the time required for the ball to travel from the point of release and enter the hoop at the front of the rim,
g = Gravitational constant at 32.2 feet/sec$^2$ The angle of release for the ball to enter the hoop at the front 16 of the rim is calculated by the equation:

$$ARFOR = atan(V_{oy}/V_{ox})$$

Where
ARFOR = Angle of release required for the ball to enter the hoop at the front of the rim;
$V_{oy}$ = Initial velocity of the ball in the Y direction;
$V_{ox}$ = Initial velocity of the ball in the X direction.

At this point, two angles of release have been calculated - the angle of release for the ball with a specific Initial velocity to enter the hoop at the back of the rim 15, and the angle of release for the ball with the same initial velocity to enter the hoop at the front of the rim 16 (see also FIG. 3). The difference between these two angles of release is calculated by the equation:

$$DELTA\ ANGLE = ARFOR - ARBOR$$

DELTA ANGLE = Difference between the angle of release for the shot to enter the hoop at the front of the rim, and the angle of release for the shot to enter the hoop at the back of the rim;
ARFOR = Angle of release for the ball to enter the hoop at the front of the rim;
ARBOR = Angle of release for the ball to enter the hoop at the back of the rim.

This Delta Angle is defined as the angular margin of error (17, as shown in FIG. 3) for a shot with the initial velocity in the X direction. In other words, the shooter can vary his angle of release anywhere between this minimum and maximum value, and still make the shot.

The program user then notes the angular margin of error, and then changes the value of the initial velocity in the X direction to see what effect it had on the angular margin of error. Invariably, a very low arch shot will have a small angular margin of error, as shown in FIGS. 1a and 1b. As the arch is increased ($V_{ox}$ decreased) the margin of error will increase, until a point where, if the arch is increased any further, the margin of error will decrease. The shot with the highest margin of error is considered the optimum shot, as the player can deviate from this shot more than any other and still make the shot.

This optimum shot can be further characterized by the sets of X,Y coordinates of the ball through it's flight. The program user can select any X position of the ball in its flight, and find the corresponding Y position for that point by determining the time for the ball to travel from its point of release to the point determined by the selected X position, using the equation:

$$TIME = (X_3 - X_0)/V_{ox}$$

Where
TIME = Time required for the ball to travel from the point of release to the point determined by the selection of the X position;
$X_3$ = X coordinate selected by the program user;
$X_0$ = X coordinate of the ball at the point of release;
$V_{ox}$ = initial velocity of the ball in the X direction, The corresponding Y component is then calculated by the equation:

$$Y_3 = V_{oy}TIME - (gTIME)/2$$

Where
$Y_3$ = Y position of the ball corresponding to the selected X position;
$V_{oy}$ = Initial velocity of the ball in the Y direction;
TIME = Time required for the ball to travel from the point of release to the point determined by the selection of the X position;
g = Gravitational constant.

As shown, after calculating the angle of release for the ball to scrape the front of the rim, the angle of release for a second shot (with the same Initial velocity)

wherein the ball just scrapes the back of the rim is calculated in similar matter as above.

The difference between these angles of release, for the initial velocity in question, is then labeled as the angular margin of error for that value of initial velocity. In other words, if the player gives the ball that amount of initial velocity, then he can vary his angle of release anywhere between this maximum and minimum value and still make the shot.

Invariably, it is found that after calculating the angular margin of effort for each incremental value of initial velocity, that the margin of error for low arch shots are small and increase as the arch increased until a point wherein the margin of error decreases as the arch is further increased. The initial velocity with the largest angular margin of error is selected as the optimum shot.

Now that the shot has been analyzed, arid the minimum and maximum acceptable angles of release, and accompanying trajectories, as well as the optimal shot, for the player has been calculated, there exists a need to display this information in a manner which is useable by the player so that he/she may emulate same.

In accomplishing this objective, one may utilize a variety of approaches. Ideally, one should incorporate this information to provide the player with the optimal shot path for use during his practice shooting, so that he/she may attempt to shoot their ball along the optimal path, or at least within the acceptable criteria comprising the minimum and maximum acceptable angles of release and associated trajectories.

For example, a series of motion detectors could be provided to alert the player when their shot falls outside the realm of what would be considered the minimum and maximum acceptable angles of release and accompanying trajectories. This could be accomplished utilizing a combination of off-the-shelf motion detectors arranged to indicate when said balls are either correctly aligned with, or outside of the desired shot paths. Another alternative means would comprise the placement of a plurality of hoops configured to envelope the optimal shot path, so that a shot would not pass through said hoops if it were not within the minimum acceptable angle of release and associated trajectories.

However, the preferred method for providing the desired path comprises the utilization of a laser grid system, either in two or three dimensions, as indicated herein.

The lasers and control system utilized in the present system are commonly available items (although utilized for purposes other than for practicing the present invention), and can be purchased through such companies as MWK Industries in Irvine California, or General Scanning of Chicago, Ill. An example is the Laser Max TM system sold by MWK Industries.

Most laser show systems can perform the functions required for the free throw training system of the present invention. A computer controlled laser can be programmed to draw out any desired shape in space. The laser (ideally, 100-200 MW) itself merely shoots out a beam, or line of light, which is reflected off of a series of aligning mirrors, and into the X and Y controlling mirrors. An IBM TM compatible personal computer, linked with the controller, is utilized to command servo motors which turn X and Y mirrors.

Figure 6:
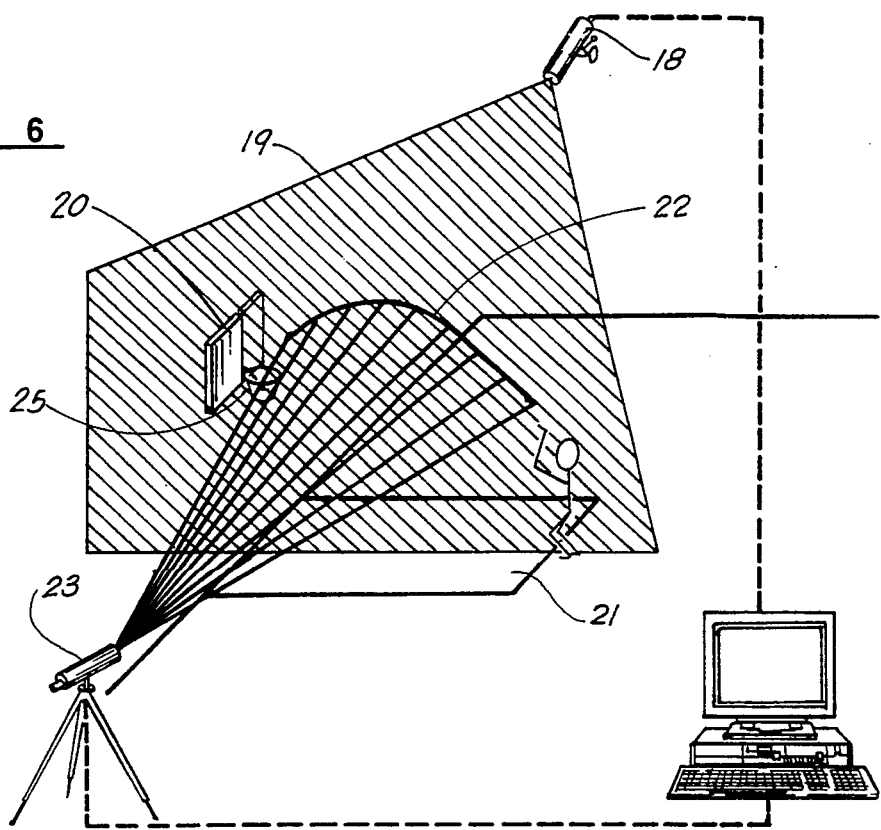
FIG. 6 illustrates the laser system of the present invention, configured for illuminating the optimal shot path, utilizing single profile and overhead lasers.

The X mirror can turn about a vertical axis to scan the beam horizontally, and the Y mirror can turn about a horizontal axis to scan the beam up and down. By coordinating the movement of these mirrors via the controller, the laser is made to scan out the desired path of the shot. Use of the lasers in combination may be accomplished as follows:

As discussed supra, in the first method, a first, overhead laser 18 will be used to draw a vertical plane 19, upon which the center of the ball should remain at all times; this plane will split the backboard in half and will go down the center of the lane. The laser will be mounted over head as to not bother the player. A second, profile laser 23 will be mounted in a profile position and will be programmed by our computer program to draw out the arch of the optimum path 22, as illustrated in FIG. 6. This laser system will provide a concrete and precise visualization of the shot. The lasers will draw lines on the ball (similar to that of the cross hairs of a rifle scope) at all times, when the ball is following the optimal path, and the player will know how far off his shot is by looking at where the line is relative to the center of the ball.

In programming the laser controller, one need only Input the X and Y components (horizontal reference distances and corresponding vertical distances) of the optimal path and/or minimum and maximum angles of release and associated trajectory XY locations. The position of the laser 23 relative to the goal 25 is incorporated into the controller, to allow for the positioning of the laser (height and distance from the goal). The laser can be made to scan the path quickly, such that the light beam appears as a solid plane representing the optimal path 22 or acceptable path, when taking into account the minimum and maximum angles of release and associated trajectories.

In use, the player attempts to position his/her shot such that the center of the ball should remain through its flight aligned with the laser guided path. Another option would be to scan the beam more slowly, such as the same speed that the ball would travel through the air, whichever the player prefers.

A 5 or 10 MW laser 18 (the brighter the better) can be mounted overhead, and the beam can be made to draw out a vertical plane which cuts through the center of the free throw line. This beam is intended to further assist the player in the shot visualization and provide a gauge or reference line to give an indication as to how well on-line the shot may be.

Figure 7A:
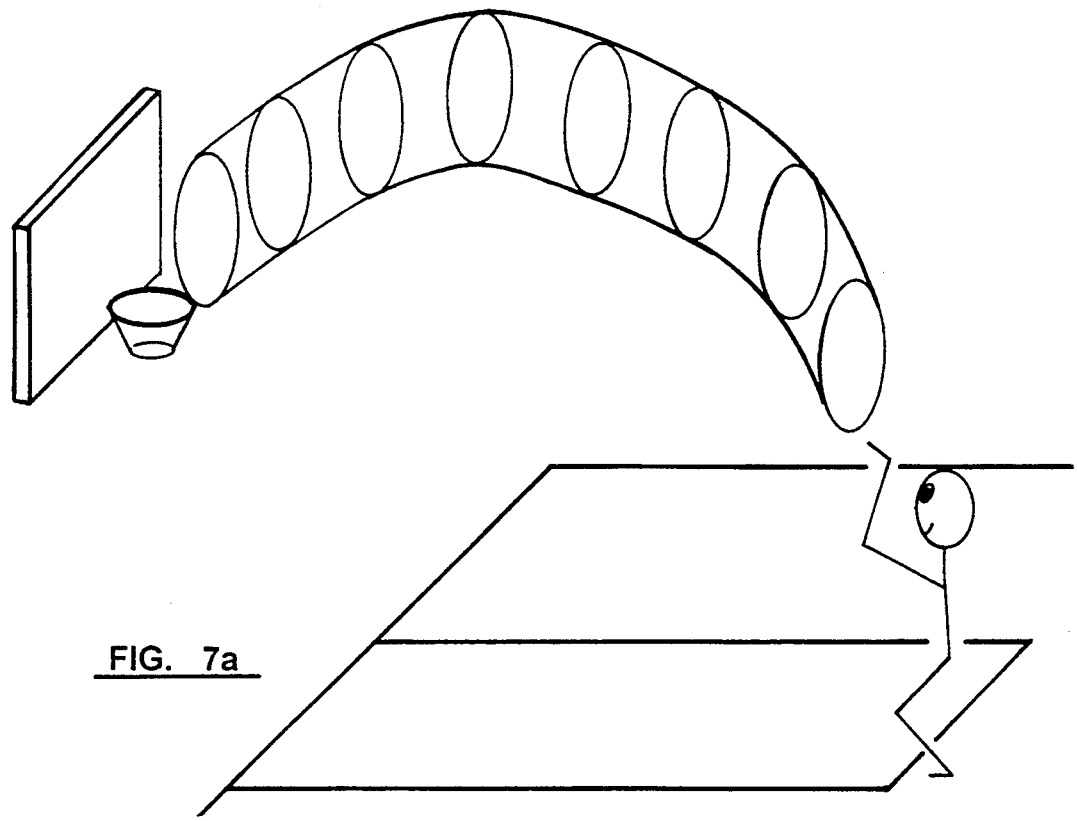
FIG. 7a illustrates an alternative conduit-type target comprising the optimal shot path, formed utilizing a pair of profile and overhead lasers.
Figure 7B:
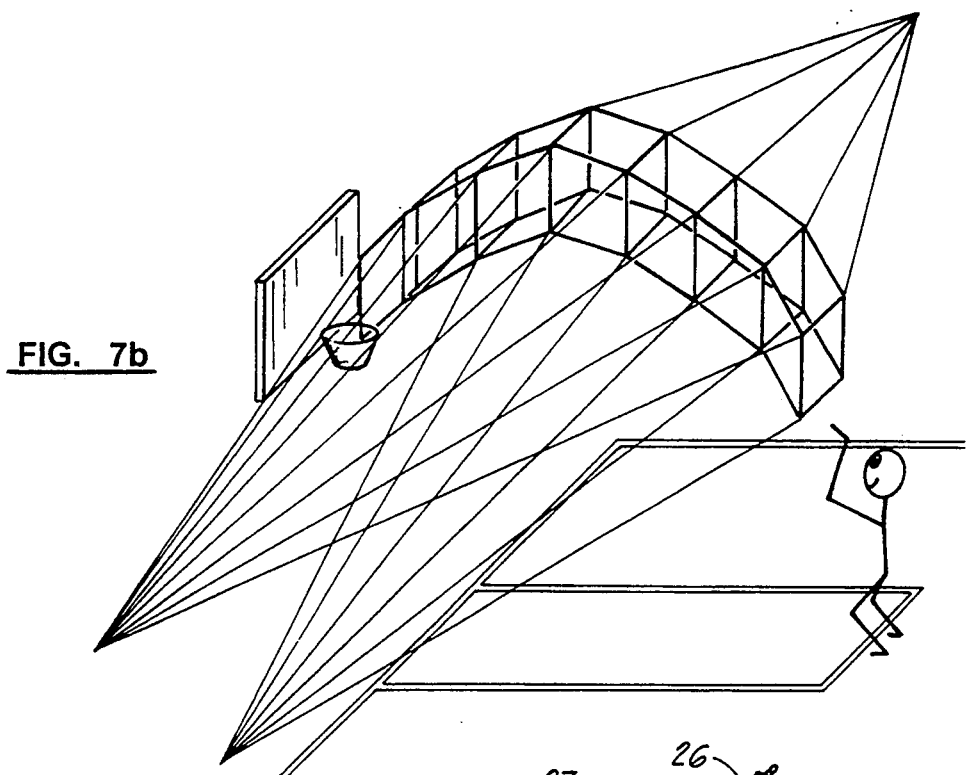
Figure 7C:
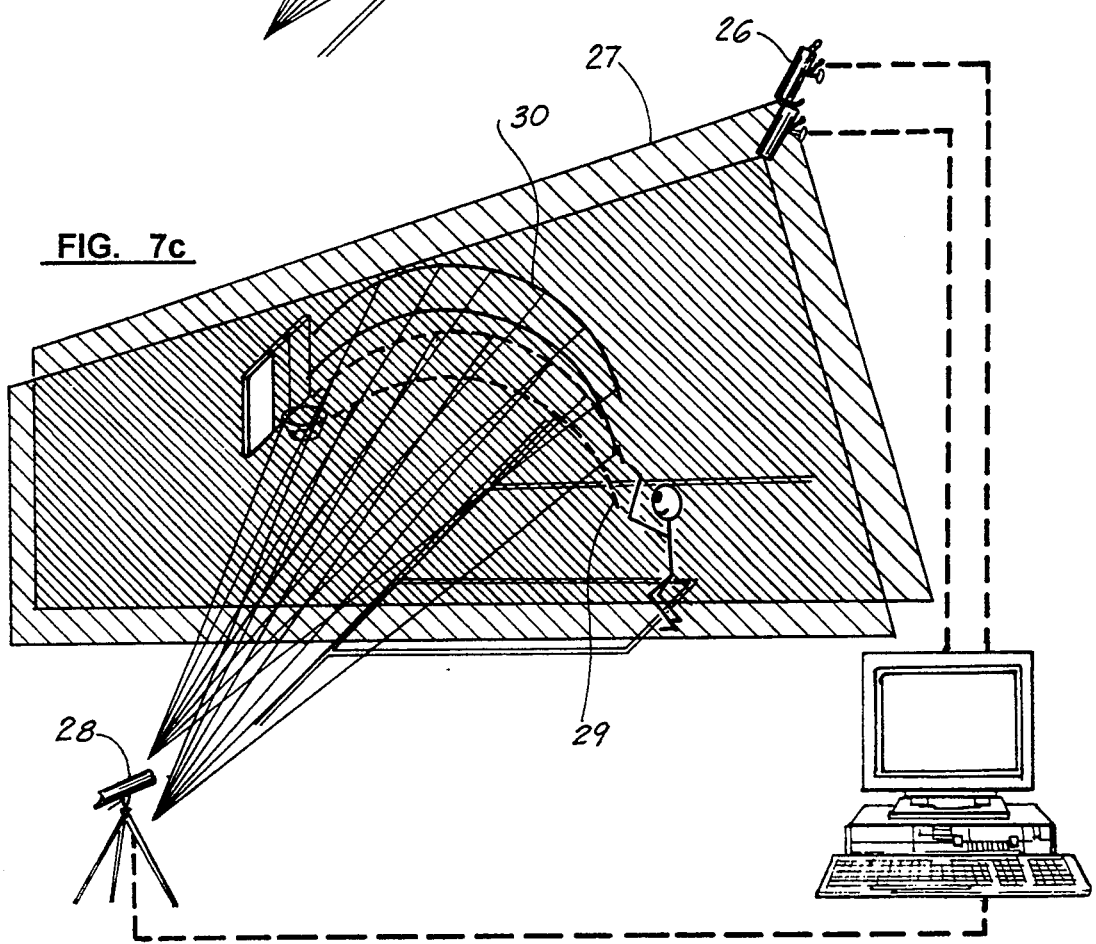

Another method of the present invention, wherein there would be provided a three dimensional target conduit (See FIG. 7A) of the acceptable path of the ball, could be fashioned by utilizing two overhead and two profile lasers (FIG. 7B), wherein the overhead lasers 26 would scan the acceptable vertical pathway 27, and the profile lasers 28 would provide the lower and upper, minimum 29 and maximum 30 angles of release and associated trajectories, respectively. In use, the ball should remain between the two planes drawn by the two overhead lasers if the shot remains "on line". It also should remain between the two curved planes if the shot has the correct arch. A successful shot would be one wherein no laser light is seen on the ball while it is in the air. If laser lines are present, the player compensates for the error, and continues his practice.

Another option on the training system of the present invention would be to turn down the volume control (brightness of the laser) until the beam cannot be seen cutting through the air. The player can tell how well a shot he has taken by looking at the laser light drawn upon the ball. This will indicate to the player how well and consistent he/she is shooting. Further, this option can be exercised as a transition between the full fledged training, wherein the player can actually see the laser path, and a game situation where no laser will be used. Further, a team on a lower budget can purchase a system with less expensive, lower power lasers (5 MW), which cannot be seen clearly in the air, but will show a line of light on a ball.

Figure 5:
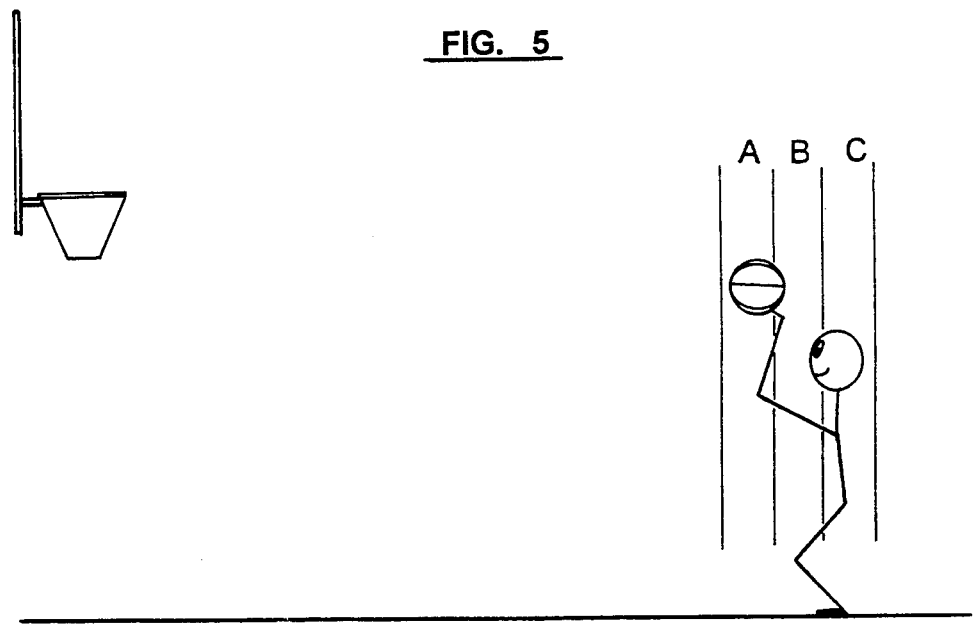
FIG. 5 illustrates the exemplary zone method of finding the point of release, illustrating zones "A", "B", and "C", positioned juxtaposed the player, and its position relative the goal.

As illustrated in FIG. 5, the method of evaluating the player can include the grouping of the various players according to their physical "zone" of release, as Illustrated. Using this method of grouping of players having similar areas of release, one can set the optimal arc for the profile laser, and utilize it with each group of players, without the necessity of resetting same for each player.

The invention embodiments herein described are done so In detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A computer implemented method for training a player to shoot a ball at a target along an arcuate optimal shot trajectory, comprising the steps of:
   a. using a computer for calculating an optimal shot path trajectory relative to said players location, said optimal shot path trajectory situated along an arcuate path running for generally the players point of release to generally said target;
   b. providing shot path indicia means for visually indicating said arcuate path, wherein indicating said accurate path further comprises the sub steps of:
      i. providing a first visible light path forming a flat vertical plane running in mid-air from the target to the player's point of release;
      ii. providing a second visible light path forming an arcuate plane, situated along said arcuate path comprising said optimal shot path;
      iii. intersecting said first and second visible light paths, indicating in mid-air said optimal shot path trajectory,
   c. aiming and shooting said ball along said intersection of said first and second light sources.

2. A computer implemented system for training a player to learn to shoot a ball along optimal arcuate shot trajectory, in order to increase the margin of error in shooting the ball, comprising:
   visual indicia means for visually indicating the location of the optimal path trajectory of the shot ball for the player, from the players predetermined point of release of the ball to the goal, said visual indicia means comprising an arcuate, target conduit formed by visual light configured to allow the passage of the ball therethrough, said target conduit having first and second ends, first and second sides, and upper and lower sides, said first end situated near the anticipated point of release of the player, said second end situated near the goal said visual indicia means further comprising first and second computer controlled overhead lasers programmed to provide a light path along the vertical pathway, forming the sidewalls of said target conduit, said first and second overhead lasers forming said first and second sides of said target conduit, respectively.

3. The apparatus of claim 1, wherein said visual indicia further comprises a first and second profile lasers configured to provide first and second light paths, along parabolic planes representing lower and upper intersecting with said first, overhead laser such that said intersection indicates the location of the optimal shot path, said first and second profile lasers forming said upper and lower sides of said target conduit, respectively.

4. The apparatus of claim 2, wherein said visual indicia further comprises a second, profile laser (23) configured to provide a light path along a generally parabolic plane such that the location of the optimal shot path is indicated.

5. A computer implemented method for training a player to shoot a ball at a target along an arcuate, optimal shot trajectory, comprising the steps of:
   a. measuring the player's anticipated point of release when shooting said ball;
   b. using a computer for calculating an optimal arcuate shot path trajectory relative to said players anticipated point of release, said optimal arcuate shot path trajectory situated along an arcuate path running from the players anticipated point of release to said target;
   c. forming an arcuate plane of visible light having first and second ends, said arcuate plane suspended in mid-air along said optimal arcuate shot path, said first end of said arcuate plane running generally from said players point of release, said second end of said arcuate plane terminating near said target;
   d. said player observing said arcuate plane of visible light and said target, while
   e. attempting to aim and shoot said ball along a trajectory path along said arcuate path of visible light;
   f. repeating steps a-e, while adjusting said ball's trajectory to follow said optimal arcuate shot path trajectory.

6. The method of claim 5, wherein step "c" comprises the further step of scanning a focused light source along an acuate path at a speed and pattern sufficient to form said arcuate plane of visible light suspended in mid-air between said player and said target along said optimal arcuate shot path.

7. A computer, implemented method for training a player to shoot a ball at a target along an arcuate, optimal shot trajectory, comprising the steps of:
   a. having the player shoot a ball at a target goal, recording on video said shot, said shot including said player releasing said ball, the path of said ball, and said target;
   b. calculating an optimal shot path trajectory relative to said player relative to said target, said optimal shot path trajectory situated along an arcuate path running from generally the players point of release to said target;
   c. displaying on a display monitor said players recorded shots, while using a computer for generating and superimposing over said player's shots said calculated optimal shot path, said calculated optimal shot path comprising a computer generated visual arcuate band having first and second ends situated on said display monitor screen, said first end situated about the point of release of said player, said second end situated near said target goal, said visual arcuate band running generally along said calculated optimal shot path;

d. comparing the player's shot patterns relative to said displayed optimal shot path;

e. repeating steps a–d, while adjusting said ball's trajectory to follow said displayed shot path.

8. The method for training a player of claim 7, wherein step "d" further includes the step of adjusting said display monitor so that it may be viewed by said player while shooting, and simultaneously displaying in real time on said display monitor said player shooting free throws and the displayed optimal shot path.

9. A computer implemented method for training a player to shoot a ball at a target along an arcuate optimal shot trajectory, comprising the steps of:

a. measuring the player's point of release relative to said target;

b. calculating an optimal shot path trajectory relative said players point of release and said target, said optimal shot path trajectory situated along an arcuate path running from generally the players point of release to generally said target;

c. providing computer controlled shot path indicia means for visually indicating said optimal shot path, comprising the additional step of:

providing a computer controlled visible light path forming an arcuate plane situated along said optimal shot path in mid-air between said player and said target, said visible light path having first and second ends, said first end situated in mid air generally near said player's point of release, said second end situated generally near said target;

d. attempting to aim and shoot said ball along a trajectory path along said arcuate path of visible light;

e. comparing the player's shot patterns relative to said displayed optimal shot path;

f. repeating steps c–e, while adjusting said ball's trajectory to follow said displayed shot path.

10. The computer implemented system of claim 9, wherein said visual indicia means further comprises a computer controlled, scanning, focused light source situated transversely relative to said player, said light source configured to oscillate a beam of light along an arcuate path at a speed and pattern sufficient to form a the appearance of arcuate plane of visible light suspended in mid-air between said player and said target, along said optimal arcuate shot path.

* * * * *